US00RE39819E

(19) United States
(12) Reissued Patent
Michaud

(10) Patent Number: US RE39,819 E
(45) Date of Reissued Patent: Sep. 4, 2007

(54) CLEANING OR DRYING COMPOSITIONS BASED ON 1,1,1,2,3,4,4,5,5,5-DECAFLUOROPENTANE

(75) Inventor: Pascal Michaud, Arbus (FR)

(73) Assignee: Atofina, Paris (FR)

(21) Appl. No.: 10/342,256

(22) Filed: Jan. 15, 2003

Related U.S. Patent Documents

Reissue of:
(64) Patent No.: 6,174,850
Issued: Jan. 16, 2001
Appl. No.: 09/358,257
Filed: Jul. 20, 1999

(30) Foreign Application Priority Data

Jul. 24, 1998 (FR) ..... 98 09464

(51) Int. Cl.
*C11D 7/50* (2006.01)
*C23G 1/00* (2006.01)

(52) U.S. Cl. ..... 510/408; 510/365; 510/407; 510/410; 510/412; 510/415; 134/40

(58) Field of Classification Search ..... 134/40, 134/42, 37; 252/364; 510/365, 273, 407, 510/175, 417
See application file for complete search history.

(56) References Cited

U.S. PATENT DOCUMENTS

| | | | | | |
|---|---|---|---|---|---|
| 5,064,559 | A | | 11/1991 | Merchant et al. | |
| 5,064,560 | A | | 11/1991 | Merchant | |
| 5,196,137 | A | | 3/1993 | Merchant | |
| 5,268,121 | A | * | 12/1993 | Michaud | |
| 5,273,592 | A | * | 12/1993 | Chi Li | 134/40 |
| 5,478,492 | A | * | 12/1995 | Barthelemy et al. | |
| 5,714,298 | A | * | 2/1998 | Barthelemy et al. | 430/124 |
| 5,762,817 | A | * | 6/1998 | Merchant et al. | |
| 5,948,174 | A | * | 9/1999 | Barthelemy et al. | 134/42 |
| 5,973,055 | A | * | 10/1999 | Michaud et al. | 524/462 |
| 6,133,332 | A | * | 10/2000 | Ide et al. | 521/131 |
| 6,174,850 | B1 | * | 1/2001 | Michaud | 510/415 |
| 6,294,055 | B2 | * | 9/2001 | Herkelmann et al. | 203/43 |
| 6,841,091 | B2 | * | 1/2005 | Michaud | 252/194 |
| 2001/0004961 | A1 | * | 6/2001 | Herkelmann et al. | 203/43 |
| 2003/0155550 | A1 | * | 8/2003 | Michaud | 252/194 |

FOREIGN PATENT DOCUMENTS

| | | | | |
|---|---|---|---|---|
| EP | 431458 | | | 12/1991 |
| EP | 512885 | | * | 11/1992 |
| EP | 653484 | | * | 5/1995 |
| EP | 851016 | A1 | * | 7/1998 |
| JP | 05124988 | | | 5/1993 |
| JP | 05124989 | | | 5/1993 |
| JP | 05124990 | | | 5/1993 |
| JP | 05124991 | | | 5/1993 |
| JP | 05124992 | | | 5/1993 |
| JP | 05124993 | | | 5/1993 |
| JP | 05124994 | | | 5/1993 |
| JP | 05124995 | | | 5/1993 |
| JP | 05124996 | | | 5/1993 |
| JP | 05124997 | | | 5/1993 |
| JP | 05124998 | | | 5/1993 |
| JP | 05140009 | | | 6/1993 |
| JP | 05148171 | | | 6/1993 |
| JP | 05148498 | | | 6/1993 |
| JP | 5-148498 | | * | 6/1993 |
| JP | 06007610 | | | 1/1994 |
| JP | 06017093 | | | 1/1994 |
| JP | 6-41519 | | * | 2/1994 |
| JP | 06071103 | | | 3/1994 |
| JP | 06157614 | | | 6/1994 |
| JP | 06205903 | | | 7/1994 |
| JP | 06226005 | | | 8/1994 |
| JP | 06234998 | | | 8/1994 |
| JP | 06240299 | | | 8/1994 |
| JP | 06298810 | | | 10/1994 |
| JP | 06340716 | | | 12/1994 |
| JP | 06341054 | | | 12/1994 |
| JP | 07113097 | | | 5/1995 |
| JP | 07113098 | | | 5/1995 |
| JP | 07197092 | A | * | 8/1995 |
| JP | 07197092 | | * | 8/1995 |
| JP | 08024504 | | | 1/1996 |
| JP | 08117503 | A | * | 5/1996 |
| JP | 08117503 | | * | 5/1996 |
| JP | WO9830623 | | * | 7/1998 |
| JP | 10195424 | A | * | 7/1998 |
| WO | WO 92/06941 | | | 4/1992 |
| WO | WO 93/05002 | | | 3/1993 |
| WO | WO 93/09216 | | | 5/1993 |
| WO | WO 94/11460 | | | 5/1994 |
| WO | WO 95/06693 | | | 3/1995 |
| WO | WO 95/32274 | | | 11/1995 |
| WO | WO 96/15206 | | | 5/1996 |
| WO | WO 97/39080 | | * | 10/1997 |
| WO | WO 00/56833 | | | 9/2000 |

OTHER PUBLICATIONS

"Etude theorique des OH° sur la HOMO des HF" Int. J. Chem., Kinet. (1994), 26(9), 913–20.

"Reactivite du 4310 avec les OH°, O1, duree de vie", J. Phys. Chem. (1993), 97(35), 8976–82.

"Reactivite du 4310, CH3Br, avec les OH°", Prepr.—Am. Chem. Soc., Div. Pet. Chem. (1992), 37(4), 1552–5.

"Reactivite due 4310, avec les OH°", Chem. Phys. Lett. (1992), 200(3), 230–4.

Zh. Org. Khim. 1980, 1401–1408 and 1982,, pp. 946–950, "New Syntheses of Coumarins,", Panetta, et al., and 1168.*

Zh. Org. Khim. 1988, Vo. 53, pp. 1557–1560, "Regioselective Synthesis of 2– and 3–(Phenylthio)juglone Derivatives", Laugraud, et al.*

(Continued)

*Primary Examiner*—Gregory Webb
(74) *Attorney, Agent, or Firm*—Smith, Gambrell & Russell LLP

(57) ABSTRACT

To replace compositions based on CFCs or CFHCs in applications for cleaning or drying solid surfaces (in particular defluxing), the invention proposes azeotropic or quasi-azeotropic compositions based on 1,1,1,2,3,4,4,5,5,5-decafluoropentane, 1,1,1,3,3-pentafluorobutane and, optionally, methanol.

14 Claims, No Drawings

OTHER PUBLICATIONS

J.Chem.Soc. J.C.S. Perkin 1, 1980, pp. 2258–2266, "C–Nucleoside Studies. Part 12.1 Synthesis of 3– –and 3–(D–Xylofuranosyl)pyrazoles",, Buchanan, et al.*

J. Chem Perk. Trans, 2 1983, 1713–1717 "Addition of Free Radicals to Unsaturated Systems. Part 24.! Kinetics and Mechanism of the Gas–phase Thermal Reactions of Trifluoroidomethane with Propane", Haszeldine, et al.*

J. Che. Soc. C. Perk. Trans, 2. 198, 1713.*

J. Chem. Soc. C 1969, 1739–1746, "Partial Fluorination of Tetrahydrofuran with Cobalt Trifluoride", J. Burdon, et al.*

Che. Soc. 1949, 2860.*

Zhurnal Analiticheskoi. himii, vol. 36, No. 6,pp. 1125–1129, Jun. 1981, Englidsh Translation: Okhta Scientific–Industrial Combine "Plastopolimer," Leningrad. "Analysis of Carbon Chain Fluoropolymers by the Method of Pyrolytic Gas Chromatography", pp. 782–785.*

J. Fluorine Chem. 1979, 325 (unavailable).*

Izv. Akad. Nauk. SSR. Ser. Khim. 1980, 2117 (in Russian) (unavailable).*

Rosz. Chem. 1979 (48), 1697 (unavailable).*

J.A.C.S. 67, 1195 (1945) "The Synthesis and Directed Chlorination of 2,2–Difluorobutane", Henne, et al.;, 73, 3577 (1950) "The Preparation of Hexafluoroacetone", Henne, et al., and 76, 2343 (1954) "Fluoroolefins. V. the Synthesis of 1,1–difluro–3–methylbutadiene" Tarrant, et al.*

Petrov, V.A., et al., Electrophilic Alkylation of Fluoroolefins by 1, 1, 1–trifluoroethane, 1980, pp. 2116–2121, Inst. Elementoorg. Soedin, Moscow, USSR.*

Bagnall, R.D., et al., New Inhalation Anesthetics v. Fluorinated Butanes (and Butenes), 1979, pp. 325335, Pharm. Div., ICI, Macclesfield/Cheshire, Engl.*

* cited by examiner

CLEANING OR DRYING COMPOSITIONS BASED ON 1,1,1,2,3,4,4,5,5,5-DECAFLUOROPENTANE

Matter enclosed in heavy brackets [ ] appears in the original patent but forms no part of this reissue specification; matter printed in italics indicates the additions made by reissue.

FIELD OF THE INVENTION

The present invention concerns the field of fluorohydrocarbons and relates more particularly to novel compositions which can be used to clean or dry solid surfaces.

BACKGROUND OF THE INVENTION 1,1,2-Trichloro-1,2,2-trifluoroethane (known in the field by the name F113) has been widely used in the industry for cleaning and degreasing solid surfaces of very diverse nature (metal components, glass, plastic, composites), for which an absence—or at least the lowest possible residual content—of impurities, in particular of organic nature, is required. F113 was particularly suitable for this use on account of its non-corrosive nature with respect to the materials used. This product has been used in particular in the field of manufacturing printed circuits, to remove the residues of the substances used to improve the quality of the solders (known by the term soldering fluxes). This removal operation is known in the field as "defluxing".

Mention may also be made of the applications of F113 to the degreasing of heavy metal components and to the cleaning of high-quality and high-precision mechanical components such as, for example, gyroscopes and military, aerospace or medical equipment. In its various applications, F113 is usually combined with other organic solvents (for example methanol), in order to improve its cleaning capacity. In this case, it is preferred to use azeotropic or quasi-azeotropic mixtures. For the purposes of the present invention, the term "quasi-azeotropic mixture" means a mixture of generally miscible chemical compounds which, under certain specific conditions of proportions, temperature and pressure, boils at a substantially constant temperature while at the same time retaining substantially the same composition. When it is heated to reflux, such a quasi-azeotropic mixture is in equilibrium with a vapour phase whose composition is substantially the same as that of the liquid phase. Such azeotropic or quasi-azeotropic behaviour is desirable to ensure satisfactory functioning of the machines in which the abovementioned cleaning operations are carried out, and in particular to ensure recycling by distillation of the cleaning fluid.

F113 is also used in fields, in particular in optics, for which it is necessary to have available water-free surfaces, i.e. surfaces on which water is only present at trace levels which are undetectable by the method of measurement (Karl Fisher method). With this aim, F113 is used in operations for cleaning (or dewetting) the said surfaces, in combination with hydrophobic surfactants.

However, the use of compositions based on F113 is now banned since F113 is among the chlorofluorocarbons (CFCs) suspected of attacking or degrading stratospheric ozone.

In these various applications, F113 can be replaced with 1,1-dichloro-1-fluoroethane (known by the name F141b), but the use of this substitute is already regulated since, although weak, its destructive effect on ozone is not non-existent.

Patent application EP 0,512,885 describes a composition comprising from 93 to 99% by weight of 1,1,1,3,3-pentafluorobutane and from 1 to 7% of methanol, which can be used as a substitute for F113. 1,1,1,3,3-Pentafluorobutane, also known in the field by the name F365 mfc, has no destructive effect on ozone.

DESCRIPTION OF THE INVENTION

The aim of the invention is to propose other compositions which can be used as substitutes for F113 or F141b, and which have no destructive effect on ozone.

To contribute towards solving this problem, a subject of the present invention is thus azeotropic or quasi-azeotropic compositions comprising from 1 to 25% of 1,1,1,2,3,4,4,5,5,5-decafluoropentane, preferably from 5 to 20%, and from 75 to 99% of 1,1,1,3,3-pentafluorobutane, preferably from 80 to 95%. Unless otherwise indicated, the percentages used in the present text to indicate the content of the compositions according to the invention are percentages by weight. 1,1,1,2,3,4,4,5,5,5-Decafluoropentane is a compound (also known by the name 43–10 mee) which is totally free of any destructive effect on ozone.

In this field, there is an azeotrope whose boiling point is 36.5° C. at normal atmospheric pressure (1.013 bar).

The compositions according to the invention make it possible to obtain very good results for the cleaning and degreasing of solid surfaces, as well as in operations for drying and dewetting surfaces. Furthermore, these compositions have no flashpoint under the standard determination conditions (ASTM standard D 3828) and thus make it possible to work in total safety.

The compositions according to the invention can readily be prepared by simple mixing of the constituents. 43–10 mee is commercially available; 365 mfc can be prepared by at least one of the following methods:

Zh. Org. Khim. 1980, 1401–1408 and 1982, 946 and 1168; Zh. Org. Khim. 1988, 1558. J. Chem. Soc Perk. I, 1980, 2258; J Chem. Soc Perk. Trans, 2, 1983, 1713; J. Chem. Soc. C Perk. Trans, 2, 198, 1713; J. Chem. Soc. C 1969, 1739; Chem. Soc. 1949, 2860: Zh. Anal. Khim. 1981 36(6), 1125; J. Fluorine Chem. 1979, 325; Izv. Akad. Nauk. SSSR. Ser Khim. 1980, 2117 (in Russian); Rosz. Chem. 1979 (48), 1697 and J.A.C.S. 67, 1195 (1945), 72, 3577 (1950) and 76, 2343 (1954).

According to a preferred variant, a ternary composition according to the invention comprises from 5 to 20% of 43–10 mee. from 75 to 90% of 365 mfc and from 1 to 10% of methanol. A ternary composition containing 10 to 15% of 43–10 mee, 80 to 85% of 365 mfc and 2 to 8% of methanol is more particularly preferred. In this field, there is an azeotrope whose boiling point is 33.2° C. at normal atmospheric pressure.

As with the known cleaning compositions based on F113 or F141b, the cleaning compositions based on 43–10 mee and 365 mfc according to the invention can, if so desired, be protected against the chemical attacks resulting from their contact with water (hydrolysis), with light metals (constituting the solid surfaces to be cleaned) and/or against the radical attacks liable to occur in the cleaning processes, by adding thereto a common stabilizer such as, for example, nitroalkanes (in particular nitromethane, nitroethane or nitropropane), acetals (dimethoxyethane) and ethers (1,4-dioxane or 1,3-dioxolane). The proportion of stabilizer can range from 0.01 to 5% relative to the total weight of the composition. It is preferred to use dimethoxymethane as stabilizer, the boiling point of which is close to that of the azeotropic compositions according to the invention; as a result, this stabilizer follows the evaporation and condensation cycle of the solvent entirely, which is particularly advantageous in cleaning applications.

The compositions according to the invention can be used in the same applications and can be employed according to the same methods as the previous compositions based on F113 or F141b. They are thus particularly suitable for use in cleaning and degreasing solid surfaces, preferably in defluxing printed circuits, as well as in operations for drying surfaces.

As regards the embodiments, mention may be made in particular of the use in devices adapted to the cleaning and/or drying of surfaces, as well as by aerosol.

These compositions can also be used as agents for expanding polyurethane foams, as agents for the dry-cleaning of textiles and as refrigeration fluids.

EXAMPLES

The examples which follow illustrate the invention without limiting it.

Example 1 a) Demonstration of a 43–10 mee/365 mfc azeotrope:

100 g of 43–10 mee and 100 g of 365 mfc are introduced into the boiling vessel of a distillation column (30 plates). The mixture is then refluxed for one hour to bring the system to equilibrium.

When a steady temperature is observed, a fraction of about 20 g is collected. This fraction, as well as the tail fraction remaining in the boiling vessel, are analysed by gas chromatography.

Examination of the results given in the table below indicates the presence of an azeotropic composition.

| | Composition (% by weight) | |
|---|---|---|
| | 43-10mee | 365mfc |
| Initial mixture | 50 | 50 |
| Fraction collected at 36.5° C. | 9 | 91 |

This azeotrope, used for cleaning soldering flux or for degreasing mechanical components, gives good results.

b) Checking the azeotropic composition:

200 g of a mixture comprising 9% of 43–10 mee and 91% of 365 mfc are introduced into the boiling vessel of a distillation column (30 plates). The mixture is then refluxed for one hour to bring the system to equilibrium.

A fraction of about 20 g is removed and analysed by gas chromatography.

Examination of the results given in the table below indicates the presence of a 43–10 mee/365 mfc azeotrope, since the fraction collected has the same composition as the initial mixture. This is a positive azeotrope since its boiling point is lower than that of the 43–10 mee (55° C.) and that of the 365 mfc (400° C.).

| | Composition (% by weight) | |
|---|---|---|
| | 43-10mee | 365mfc |
| Initial mixture | 9 | 91 |
| Fraction collected at 36.5° C. | 9 | 91 |

Example 2

Composition Stabilized with Dimethoxymethane (methylal)

150 g of a mixture containing, by weight, 9% of 43–10 mee, 90.5% of 365 mfc and 0.5% of methylal as stabilizer are introduced into a small ultrasound cleaning tank. After refluxing the system for one hour, an aliquot of the vapour phase is taken. Its analysis, by gas chromatography, shows the presence of methylal, which indicates that the mixture is also stabilized in the vapour phase.

| | Composition (% by weight) | | |
|---|---|---|---|
| | 43-10mee | 365mfc | methylal |
| Initial mixture | 19 | 90.5 | 0.5 |
| Vapour phase | 9 | 90.5 | 0.5 |

Example 3 a) Demonstration of a 43–10 mee/365 mfc/methanol Azeotrope:

100 g of 43–10 mee, 100 g of 365 mfc and 50 g of methanol are introduced into the boiling vessel of a distillation column (30 plates). The mixture is then refluxed for one hour to bring the system to equilibrium. When a steady temperature is observed, a fraction of about 20 g is collected. This fraction, as well as the tail fraction remaining in the boiling vessel, are analysed by gas chromatography.

Examination of the results given in the table below indicates the presence of an azeotropic composition.

| | Composition (% by weight) | | |
|---|---|---|---|
| | 43-10mee | 365mfc | methanol |
| Starting mixture | 40 | 40 | 20 |
| Fraction collected at 33.2° C. | 12 | 83 | 5 |

b) Checking the Azeotropic Composition:

200 g of a mixture comprising 12% of 43–10 mee, 83% of 365 mfc and 5% of methanol are introduced into the boiling vessel of an adiabatic distillation column (30 plates). The mixture is then refluxed for one hour to bring the system to equilibrium.

A fraction of about 20 g is removed and analysed by gas chromatography.

The results given in the table below show the presence of a positive azeotrope, since its boiling point is lower than that of its three components.

| | Composition (% by weight) | | |
|---|---|---|---|
| | 43-10mee | 365mfc | $CH_3OH$ |
| Initial mixture | 12 | 83 | 5 |
| Fraction collected at 33.2° C. | 12 | 83 | 5 |

This azeotrope, used for cleaning soldering flux or for degreasing mechanical components, gives good results.

As in Example 2, the above azeotropic composition can be stabilized with 0.5% of dimethoxymethane.

Example 4

Cleaning of Soldering Flux

The following test is carried out on five test circuits in accordance with standard IPC-B-25 described in the test methods manual from IPC (Institute for Interconnecting and Packaging Electronic Circuits: Lincolnwood, Ill. USA). These circuits are coated with colophony-based soldering flux (product sold by the company Alphametal under the name flux R8F) and annealed in an oven at 22° C. for 30 seconds.

To remove the colophony thus annealed, these circuits are cleaned using the azeotropic composition of Example 3, in a small ultrasound machine for 3 minutes by immersion in the liquid phase and 3 minutes in the vapour phase.

The cleaning is evaluated according to the standardized IPC procedure 2.3.26 (also described in the abovementioned manual) using a precision conductimeter. The value obtained, 2.2 $\mu g/cm^2$ eq.NaCl, is less than the ionic impurities threshold tolerated by the profession (2.5 $\mu g/cm^2$ eq.NaCl).

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Azeotropic or quasi-azeotropic compositions comprising from 1 to 25% of 1,1,2,3,4,4,5,5,5-decafluoropentane, and from 75 to 99% of 1,1,1,3,3-pentafluorobutane.

2. Composition according to claim 1, in the form of an azeotrope whose boiling point is 36.5° C. at normal atmospheric pressure.

3. Compositions according to claim 1, comprising from 5 to 20% of 43–10 mee, from 75 to 90% of 365 mfc and from 1 to 10% of methanol.

4. Compositions according to claim 1, comprising 10 to 15% of 43–10 mee, 80 to 85% of 365 mfc and 2 to 8% of methanol.

5. Composition according to claim 3, in the form of an azeotrope whose boiling point is 33.2° C. at normal atmospheric pressure.

6. Compositions according to claim 1, further comprising at least one stabilizer.

7. Method for cleaning and degreasing solid surfaces comprising treating said surfaces with the composition of claim 1.

8. Azeotropic or quasi-azeotropic compositions according to claim 1, wherein the amount of decafluoropentane is from 5 to 20% and the amount of pentafluorobutane is from 80 to 90%.

9. Composition according to claim 6, wherein the stabilizer is dimethoxymethane.

10. Method according to claim 7, wherein the treatment is defluxing a printed surface.

11. Method according to claim 7, wherein the treatment is drying.

*12. A composition comprising from 5 to 20% by weight of 1,1,1,2,3,4,4,5,5,5-decafluoropentane, from 75 to 90% by weight of 1,1,1,3,3-pentafluorobutane and from 1 to 10% by weight of methanol.*

*13. Method for cleaning and/or degreasing solid surfaces comprising treating said surfaces with a composition comprising from 1-25% of 1,1,1,2,3,4,4,5,5,5-decafluoropentane and from 75-99% of 1,1,1,3,3-pentafluorobutane.*

*14. Method for cleaning and/or degreasing solid surfaces comprising treating said surfaces with a composition comprising from 5 to 20% by weight of 1,1,1,2,3,4,4,5,5,5-decafluoropentane, from 75 to 90% by weight of 1,1,1,3,3-pentafluorobutane and from 1 to 10% by weight of methanol.*

* * * * *